United States Patent [19]

Lang

[11] 4,385,493

[45] May 31, 1983

[54] HYDRAULICALLY ASSISTED STEERING DEVICE

[75] Inventor: Armin Lang, Schwabisch Gmund, Fed. Rep. of Germany

[73] Assignee: Zahnradfabrik Friedrichshafen, AG, Friedrichshafen, Fed. Rep. of Germany

[21] Appl. No.: 175,746

[22] Filed: Aug. 6, 1980

[51] Int. Cl.³ .................... F15B 11/08; F15B 13/042
[52] U.S. Cl. ..................................... 60/464; 91/461; 91/465
[58] Field of Search ................... 60/464; 91/465, 461; 180/132

[56] References Cited

U.S. PATENT DOCUMENTS 3,922,953 12/1975 Strouff .................................. 91/465
4,123,964 11/1978 Strouff .................................. 91/465
4,219,093 8/1980 Lang .................................. 180/132

FOREIGN PATENT DOCUMENTS 2729766 1/1979 Fed. Rep. of Germany .

Primary Examiner—Paul E. Maslousky
Attorney, Agent, or Firm—Zalkind & Shuster

[57] ABSTRACT

Pump pressure in a fluid power assisted steering device is regulated through the suction side of the pump to supply pressurized fluid to a servomotor through a fluid pressure actuated steering control valve. A pre-control valve controls pressure in an actuating chamber of the steering control valve in response to displacement of the hand steering wheel to obtain a variation in servomotor pressure that is a linear function of the force applied to the steering wheel up to a cut-out point, above which the servomotor pressure rises sharply to a maximum value.

8 Claims, 7 Drawing Figures

HYDRAULICALLY ASSISTED STEERING DEVICE

BACKGROUND OF THE INVENTION

The invention concerns a hydraulically assisted steering device which is preferably suitable for use in motor vehicles, i.e. for acting upon a steering handwheel or a steering wheel in the case of a ship. According to my prior U.S. Pat. No. 4,219,093, steering may be selectively effected either by turns on the steering wheel or through a sensor monitoring a directrix. With such an arrangement, pre-control valves are actuated by the sensor. In the context of this invention they shall be actuated by the steering wheel.

Hydraulically assisted steering devices of the foregoing type must have a device for achieving a cut-out effect. Within a proportional band the pressure in one working chamber of the steering motor increases proportionally to the force applied to the actuating device. Once pressure and force have exceeded a certain limit the increase in the force shall be only slight, whilst the pressure shall increase steeply. This leads to high pressure being available e.g. for parking operations with relatively little manual force needed, whilst (although quite harmless) there are forces acting upon the steering elements (such as wheels) within the cut-out range, for which there is no feedback to the actuating device.

SUMMARY OF THE INVENTION

This invention is based on the requirement to create a hydraulically assisted steering device with a high hydraulic efficiency, on which the steering valves are not required to process all of the working flow passing to the steering motor and can, therefore, be of a simplified design. It shall be possible, as is usual with hydraulically assisted steering devices, to achieve the cut-out effect.

By using a reciprocating piston pump controllable on the suction side, and controlling the suction side via a third pair of control edges of the control valves at any one time, the hydraulic energy available at the servo-pump is utilised without incurring any substantial losses. This is achieved with a minimum of constructional work needed at the steering gear unit. Due to the low concentration of energy at the control component in communication with the steering gear unit, no disturbing flow noises are transmitted via e.g. the steering column into the passenger compartment of a motor vehicle.

In addition the cut-out device ensures that the energy-saving steering unit achieves the absolutely necessary cut-out effect with minimum structural modification and high operational safety.

BRIEF DESCRIPTION OF DRAWING FIGURES

Embodiments of the invention will now be described with reference to the drawing of which FIG. 1 is a schematic illustration of the principle of the invention but without the device for achieving the cut-out effect.

DETAILED DESCRIPTION OF PREFERRED EMBODIMENTS

Figure 1:
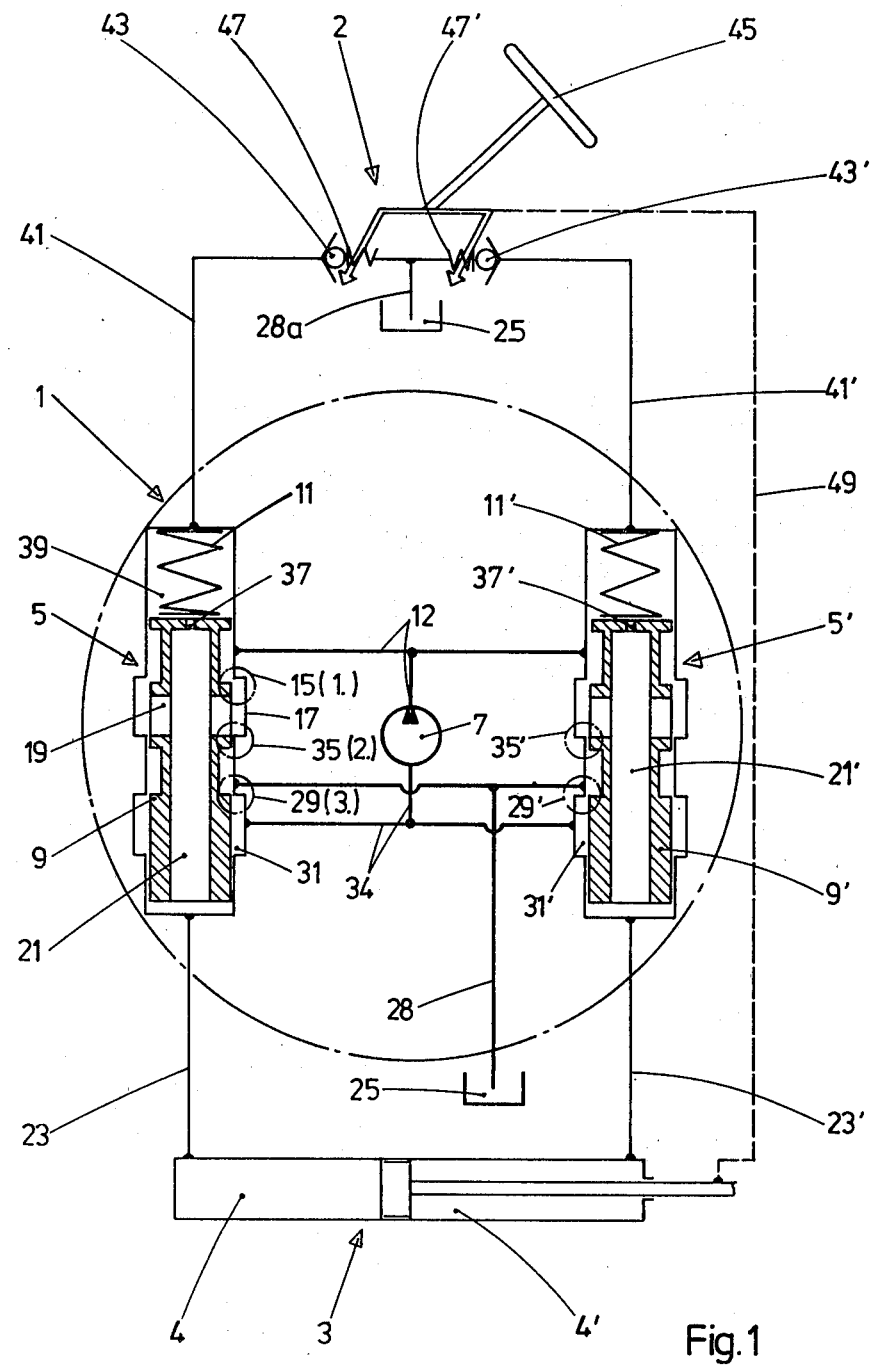

As shown in FIG. 1, an hydraulically assisted steering device according to the invention is comprised of three main sections, i.e. an energy supply unit 1 illustrated inside a circle, an actuating unit 2 and a steering motor 3.

The energy supply unit 1 comprises two steering valves 5 and 5' and a piston pump 7 controllable on the suction side and simply called "pump" from now on. The two steering valves have a valve piston 9, 9' and a working spring 11, 11' each and act as pressure balances. The associated valve housings are shown in outline only.

The pump 7 delivers to a high pressure line 12, the two branches of which lead to the two valve housings. Only the left half of the device will now be described in detail. The right half is of identical design. Inside the steering valve 5 high pressure line 12 is in communication with an annular groove 17 via a pair of control edges 15. This groove 7 is in communication with the inner chamber of the valve piston, i.e. the pressure chamber 21, via through holes 19 arranged in the valve piston wall. This pressure chamber is connected with one working chamber of the steering motor 3 via a working line 23.

From a tank 25 holding the working fluid a tank line 28 with branches leads to the two steering valves. The tank line serves as suction and as return line. Inside the steering valve 5 the connection of tank line 28 is in communication with an annular groove 31 of the valve housing via a pair of control edges 29. Connected to annular groove 31 is a suction line 34 of the pump 7.

A further pair of working edges 35 permits a connection to be set up from the pressure chamber 21 of the steering valve to the tank line 28.

On its side adjacent to the working spring 11 the valve piston 9 is equipped with a throttle opening 37. The adjoining spring chamber 39 is in communication with a pre-control valve 43 in the form of a pressure-holding valve via a control line 41. The spring chambers of both pre-control valves 43 and 43' are connected to a tank line 28a.

The actuating unit 2 is equipped with an actuating device 45 (e.g. a steering handwheel) which, when turned in opposite directions, acts upon the two springs 47, 47' of the pre-control valves. In addition, the actuating device has a mechanical effect upon a steering element which is schematically shown as the broken line 49. The pre-control valves 43, 43' are open when in neutral position, i.e. when the actuating device 45 is not acted upon by any forces. With a turn on the steering wheel one of the springs 47, 47' is loaded proportional to the force acting upon the actuating device.

The flow path of the working fluid will now be described for the left side of FIG. 1 and the neutral position shown there. From the tank line 28 working fluid reaches the suction side of pump 7 via the pair of control edges 29 and the suction line 34. The pressure fluid delivered by the pump flows through the high pressure line 12 and the pair of control edges 15 into the pressure chamber 21, through the throttle opening 37, the control line 41 and the open pre-control valve 43 into the tank 25. In this case the pair of control edges 29 and the working spring 11 ensure that the pre-control valve 43 is supplied with a constant control flow. Pump 7 is controlled on the suction side.

If, with a turn at the steering wheel, the force applied to the spring 47 of the pre-control valve 43 is e.g. increased, its flow cross-section is reduced. This leads to an increase in pressure in the spring chamber 39 causing valve piston 9 in FIG. 1 to move downwards; as a result the pair of control edges 29 open sufficiently wide for the pump 7 to receive the necessary suction flow. The pressure of the fluid delivered by pump 7 accordingly increases and such increase is communicated to pressure chamber 21 through the valve passage at the control edges 15 and hole 19 in the valve piston 9. The increased pressure in pressure chamber 21 of the steering valve 5 has an effect upon the left working chamber 4 of the steering motor, and the pump delivers the amount of fluid required for the adjustment. The amount of fluid displaced from the working chamber 4' reaches the pressure chamber 21' of the righthand steering valve 5'. Due to the rising pressure in this chamber valve piston 9' in FIG. 1 moves upwards until the pair of control edges 35' opens allowing working fluid to leave through the tank line 28.

The two steering valves, therefore, act as limit valves for the suction flow of the pump thus leading to the required saving in energy. The differential pressure resulting from the working springs 11, 11' and the cross-section of the steering valves counterbalances the currents flowing through the throttle openings 37, 37'. The flow currents in the control lines 41, 41' are small compared with the working flow currents. Therefore, the energy occurring in the actuating unit has a low concentration, so that no disturbing flow noises are transmitted via e.g. a steering column into the passenger compartment of a motor vehicle.

The two mutually independent steering valves lead to troublefree operation as evident from the following consideration.

Let us assume that in neutral position or with a turn at the steering wheel the current flowing through the throttle opening 37 is e.g. too small for the steering position. The result is an insufficient pressure differential between the pressure chamber 21 and the spring chamber 39. The working spring 11 will, therefore, press the valve piston 9 in FIG. 1 downwards. The pair of control edges 29 will open further and the delivery rate of the pump 7 will increase, until the current flowing through the throttle opening 37 has reached its pre-set value.

Conversely, if the current flowing through throttle opening 37 is too large, because e.g. the pair of control edges 29' of the steering valve 5' are too far open, it may happen that closure of the pair of control edges 29 is not enough (due to the bypass at the pair of control edges 29') to create the equilibrium at the steering valve 5 (acting as pressure balance). In this case the current flowing from the high pressure line 12 to the pressure chamber 21, is limited by the pair of control edges 15.

If even this is not sufficient for limiting the current flowing through the throttle opening 37, e.g. because due to a movement to the left by the piston of steering motor 3 additional working fluid is delivered via the working line 23 to the pressure chamber 21, the valve piston 9 will be pushed even further against its working spring 11, and the surplus working fluid is allowed to leave via the now open pair of control edges 35 to the tank 25.

Thus it is ensured that independent of the position of the valve pistons 9, 9' in relation to each other, in each operational state, the control currents flowing to the actuating device are constant. The pressure balances copy the pressures set at the pre-control valves in the known manner in the two working chambers of the steering motor 3.

To start with let us assume the case, that one of the working chambers of the steering motor, e.g. the working chamber 4, is under pressure without the spring 47 having being tensioned by the actuating device 45. This leads to an increase in the pressure difference between the pressure chamber 21 and the actuating chamber 39 resulting in an upward-acting force (FIG. 1) upon the valve piston 9. Should this force not be sufficient, counter-steering may be employed to build up pressure in the working chamber 4' for acting upon the piston of the steering motor, thus increasing the pressure in the working chamber 4. Due to the counter-steering pre-control valve 43 has opened and spring chamber 39 has lost its exposure. Thus valve piston 9 is exposed to the full force due to the pressure in working chamber 4 of the steering motor. The valve piston is pushed against its working spring 11, and pushed for so long, until the pair of control edges 35 opens allowing working fluid to flow off to the tank thus relieving the pressure in working chamber 4.

Now let us assume the opposite case, where there is a demand for a build-up of pressure in working chamber 4, but where this cannot be achieved because e.g. the valve body of the pre-control valve 43 does not close due to an ingress of foreign particles or because the pre-control throttle 37 is blocked. In this case the pressure present in pressure chamber 21 ensures that valve piston 9 continues to be pushed upwards until pressure chamber 21 and working chamber 4 are without any pressure. This is, however, not regarded as critical, for it is comparable to a failure of pump 7, in which case steering is effected via the mechanical connection 49.

Figure 2:
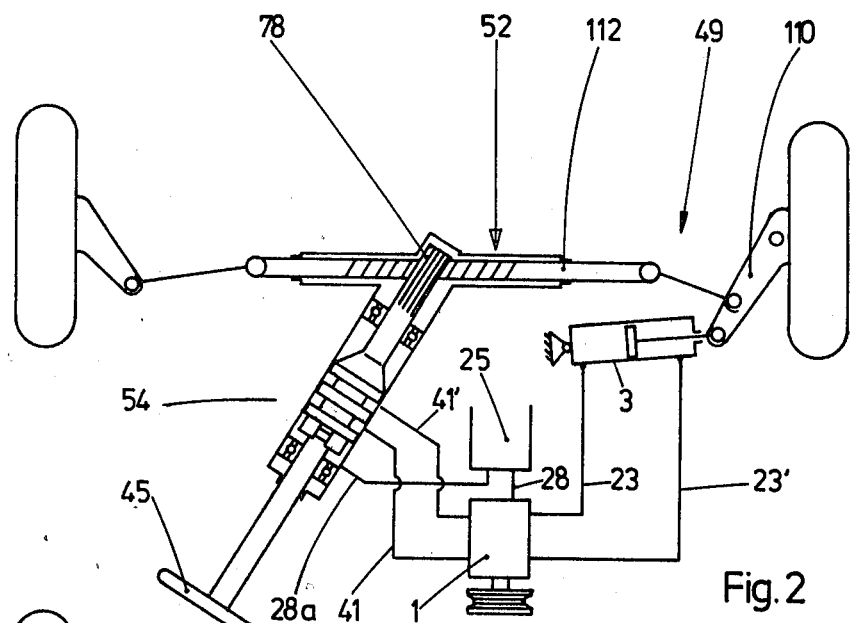
FIGS. 2 and 3 are illustrations of two different forms of the invention for use with rack and pinion steerings.

FIG. 2 shows a steering device with a mechanical rack and pinion steering 52 comprising a control head 54 and an energy supply unit 1 driven from the motor and containing the pump 7 and the steering valves 5, 5' (FIG. 1), the tank 25 and the steering motor 3. It is of particular importance that the lines leading to the control head, i.e. the two control lines 41, 41' and the tank line 28a, are of comparatively small cross-section. On the other hand, the working lines 23, 23' carrying the steering energy as such, should be run only between the energy supply unit 1 and the steering motor 3, and between the unit 1 (line 28) and the tank 25 respectively.

As is already known, the steering motor 3 may also form an integral part with the rack and pinion steering. There are, however, advantages to a separate arrangement, in particular with subsequent installation, since mechanical rack and pinion steerings are usually provided with a steering damper, whose place may then be taken by the motor.

Figure 3:
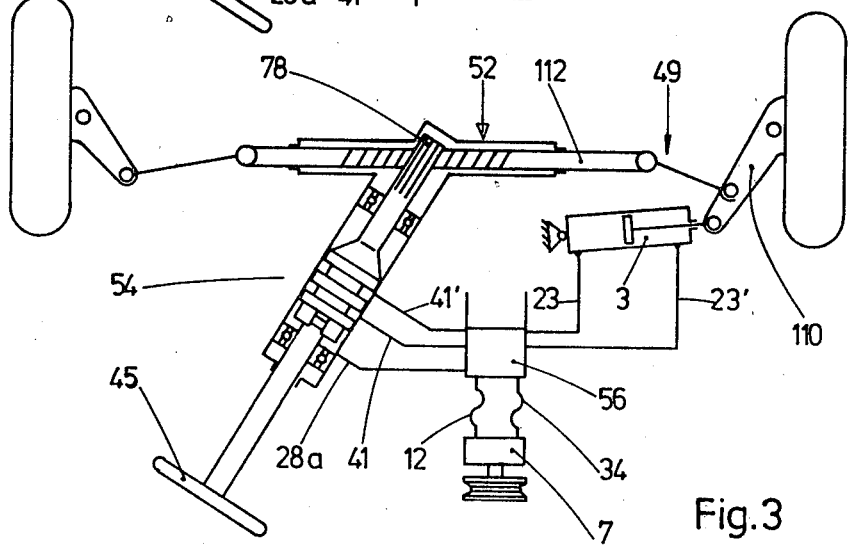

With the embodiment according to FIG. 3, the steering valves are integrated, not with the pump 7, but with the tank to form a unit 56, which is of advantage when, for constructional reasons, hose lines have to be employed to form the connections 12, 34 to the pump 7.

Figure 4:
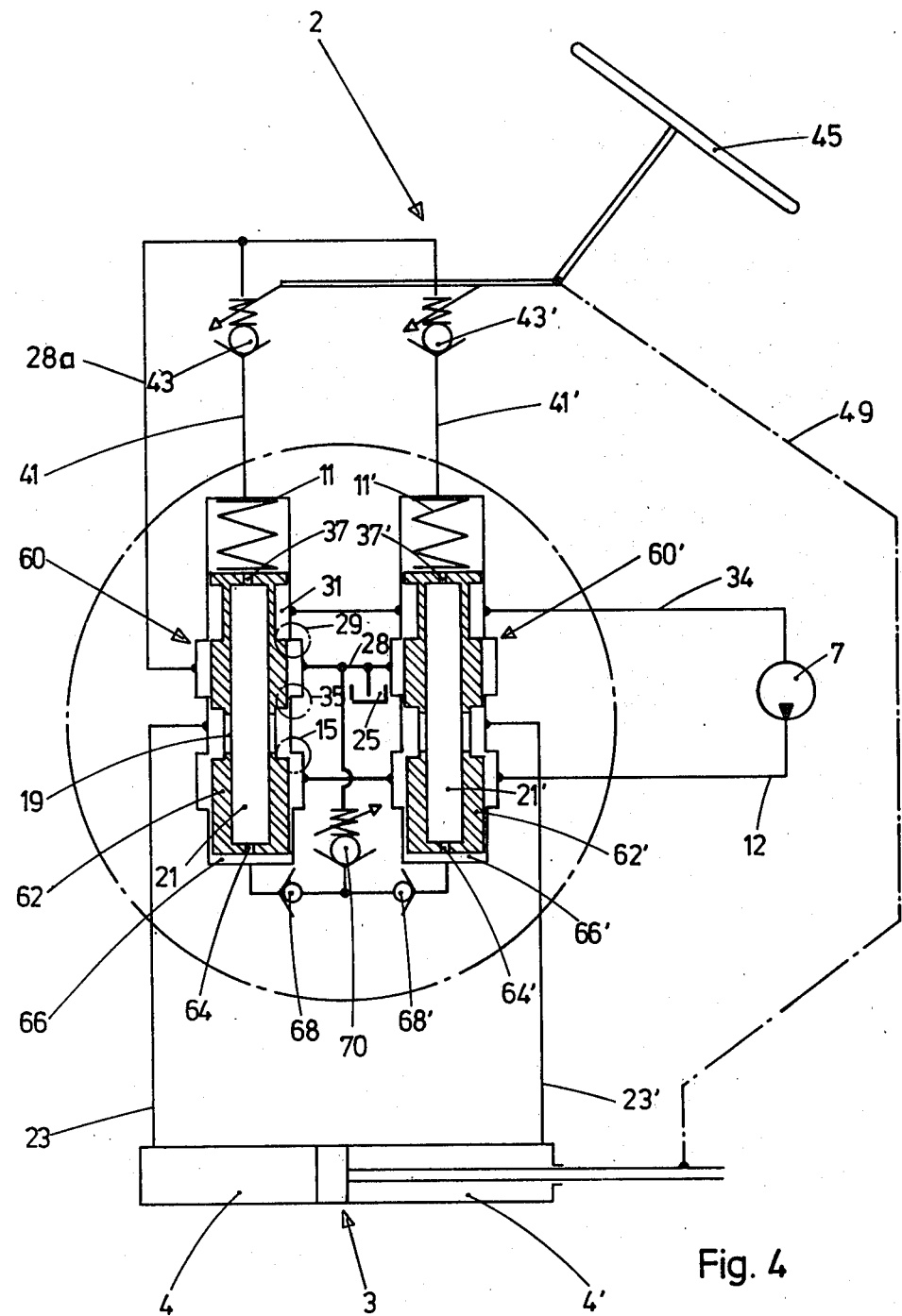
FIG. 4 is an illustration of the principle of a steering device with hydrostatic means for achieving the cut-out effect.

FIG. 4 shows an embodiment, where the cut-out effect is achieved with hydraulic means. Parts synonymous with those in FIG. 1 bear the same reference number and will not be described.

In this embodiment, the two steering valves 60 and 60' are integrated not with the pump 7, but with the tank 25. The pairs of control edges occupy a position different from that in FIG. 1, but have the same function as is indicated by their reference numbers. The valve pistons 62 and 62' are equipped with throttle openings 64 and 64', i.e. with feedback throttles on the side not facing the working springs. The associated feedback chambers 66, 66' of the steering valves are each connected via a back pressure valve 68, 68' with a common pressure limiting valve 70. The spring chamber of this valve is connected with the tank line 28.

Function

The feedback throttles 64, 64', in conjunction with the back pressure valves 68, 68' and the pressure limiting valve 70, limit the pressure in the feedback chambers 66, 66' of the pressure balances and thus the control pressure. For instance, if during a turn on the steering wheel the pre-control valve 43 is set at a higher pressure than the pressure limiting valve 70, no fluid flows to the pre-control throttle 37. This upsets the control action of the pressure balance. The working fluid flows through the feedback throttle 64, the back pressure valve 68 and the pressure limiting valve 70 to the tank. The valve piston 62 is pushed downwards irrespective of any larger forces acting upon the pre-control valve 43 in FIG. 4. This causes an increase in pressure in the working chamber 4 of the steering motor causing expansion thereof and contraction of chamber 4'. The fluid in chamber 4' is displaced therefrom through line 23' into valve chamber 21' and through the throttle 64' into reaction chamber 66'. As a result, an increasing pressure in reaction chamber 66' displaces valve piston 62' against the bias of spring 11' until control edges open to conduct fluid through line 28 to the tank 25. Thus, the steering motor 3 is adjusted without any feedback.

Figure 5:
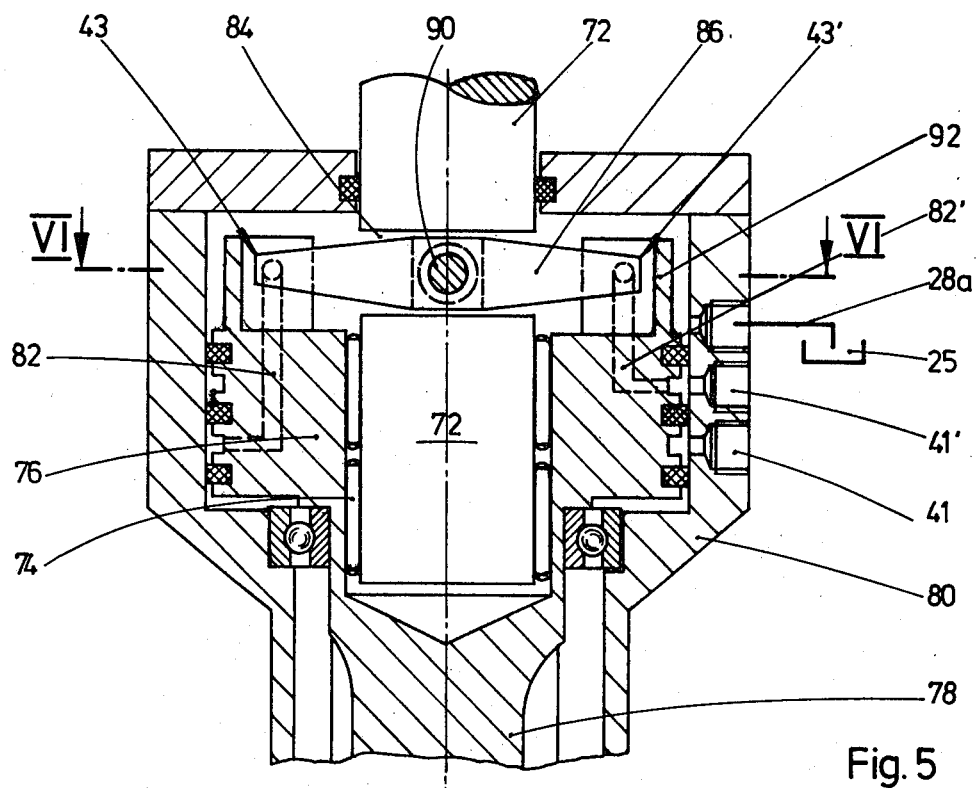
FIGS. 5 and 6 are an axial and a cross-section respectively of a mechanical device for achieving the cut-out effect.
Figure 6:
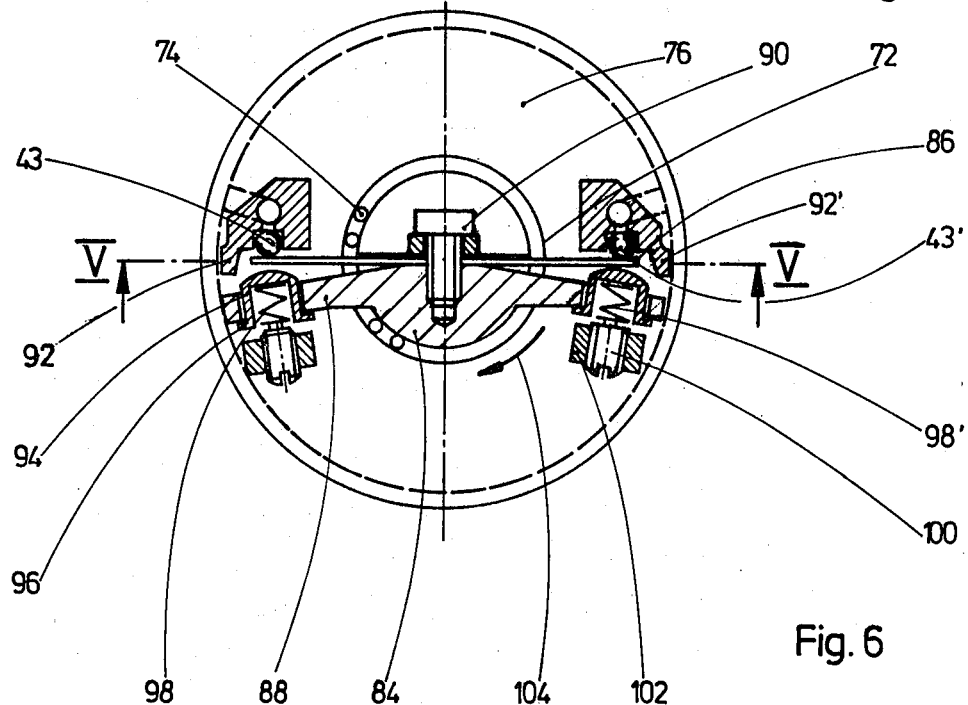

FIGS. 5 and 6 show an embodiment of the actuating unit 2 (see also FIG. 1) with mechanical means for achieving the cut-out effect.

A steering spindle 72 which is rotatable by an actuating device, is rotatably mounted in an output part 76 by means of needle bearings 74. In conjunction with a rack and pinion steering, the output part may be designed to form an integral part with the pinion 78. The two pre-control valves 43 and 43' are housed in a housing 80, the inner chamber of which is connected with the tank line 28a. The two control lines 41 and 41' lead to the valve seats via separate ring grooves and channels 82, 82'.

The steering spindle 72 forms an integral part with a crossarm 88. Attached to the crossarm by means of a screw 90 is a leaf spring 86 fitting into a lateral recess 84 of the steering spindle 72 at the level of this crossarm 88. The output part 76 is equipped with rigid stops 92 for the ends of the crossarm 88 thus limiting the area of free movement of the steering spindle in relation to the output part and permitting steering in case of failure of the hydraulic assist.

The leaf spring 86 forms the two working springs of the pre-control valves 43 and 43' and ensures valve actuation within the proportional band.

The cross arm 88 has two lateral holes on the ends which loosely hold two cups 94. They are supported against the crossarm by a collar 96 each, and each holds one of two centering springs 98. Their centre position is adjusted by means of two adjusting screws 100 located in shoulders firmly attached to the output part 76.

The centering springs have a far greater stiffness (100-fold e.g.) than the arms of the leaf spring 86. The centering springs also serve to limit the pressure, i.e. to limit it to a maximum admissible working pressure as regards the steering device.

In neutral position (as illustrated in FIG. 5) the arms of the leaf spring 86 do not exert any force upon the spheres of the pre-control valves 43, 43'. As a result the spring chamber 39 (see also FIG. 1) is without any pressure, and the hydraulic system is ineffective.

Figure 7:
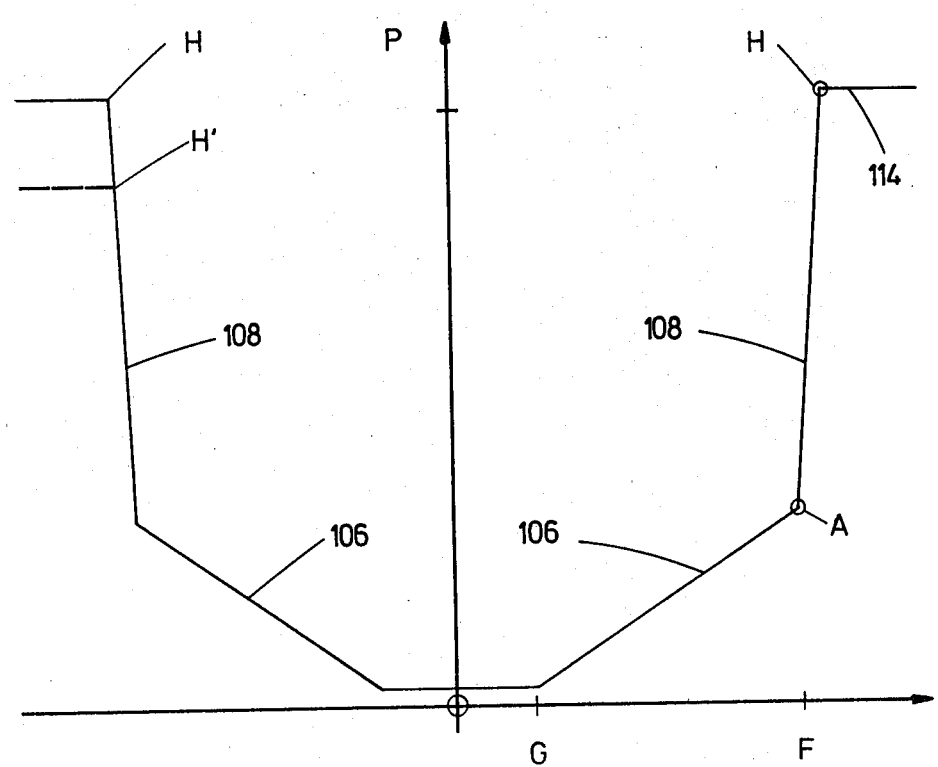
FIG. 7 is a steering characteristic.

As a torque is introduced by the steering spindle 72, it is supported against pinion 78, and both parts rotate against each other. If e.g. the crossarm 88 is deflected in the direction of the arrow 104 in relation to the output part 76, the centering spring 98' is compressed and the spring 98 is relieved. FIG. 7 shows a graph illustrating the dependence of the pressure p operating in the steering motor from the force F acting upon the actuating device. At the beginning of a steering turn, starting at point O, only force F initially increases without the hydraulic system being effective. Until point G (the boundary force) has been reached, the left arm of leaf spring 86 does not exert any force upon the pre-control valve 43. All the same, the force acting upon the actuating device increases due to the effect of the two centering springs 98, 98'. Once the boundary force G has been reached the leaf spring exerts a force upon the valve 43, and the pressure p in the working chamber of the steering motor rises corresponding to the straight line 106. The device is now within the proportional band. The force noticeable on the actuating device emanates almost exclusively from the centering springs 98, 98' and to a very small degree from the leaf spring. But it is the leaf spring which has the decisive influence upon the pre-control valve 43.

At the end of the proportional band, as cut-out point A is reached, pressure p in the steering motor shall rise steeply, whereas the force F acting upon the actuating device shall increase only slightly. In other words, the device shall operate in accordance with the steeply rising branch 108. This is achieved due to the cup 94 touching the left arm of the leaf spring 86. Upon a further minute rotation, the valve 43 is closed completely due to the influence of the centering spring 98, and the pressure in the steering motor rises corresponding to the branch 108 until it has reached the maximum admissible limit.

From the moment of contact between cup 94 and leaf spring arm (the moment which corresponds to the cut-out point) all feedback from the centering spring 98 to the crossarm and the actuating device ceases, and only the feedback force from the already highly tensioned centering spring 98' remains. All the same, no sudden increase in force will be felt on the actuating device, as the cut-out point is passed. For the working pressure in the steering motor which rises steeply from the cut-out point onwards, ensures, by means of the mechanical connection from the piston rod of the steering motor via the steering element 110, the rack 112 and the pinion 78 (see also FIG. 2), that the pinion and output part 76 (FIG. 5) are rotated away from the steering spindle 72. Thus the hydraulic system comes into action before the sudden increase in force mentioned above can become effective, therefore no increase in force will be felt at point A.

As point H (FIG. 7) is reached, no further increase in pressure in the steering motor is wanted. This is achieved in that one of the centering springs (in the example the left centering spring 98) yields sufficiently to allow pressure fluid leaving the pre-control valve 43. As a result valve piston 9 in FIG. 1 will move far enough upwards to ensure that the pressure in working chamber 4 of the steering motor does not exceed maximum value H.

As point H is passed cup 94 is lifted from the crossarm 88. The remaining influence is that of the centering spring 98' upon the crossarm, so that a sudden increase in force along the branch 114 (FIG. 7) can be felt at the actuating device. This increase in force cannot be rendered ineffective by the hydraulic system, since its pressure is limited to the maximum value H. In any case, an increase in force is desirable at this point, for the driver should be made aware that a stronger hydraulic assist is not available.

As the force rises further along branch 114, a point is ultimately reached, where the crossarm 88 comes to rest against the stop 92 and the output part 76 thus mechanically follows the steering spindle 72. This occurs even in the case of failure of the hydraulic system.

The centering springs 98 and 98' may be adjusted to centre position by means of screws 100, i.e. in such a way that in neutral position no force is acting upon the actuating device. By tightening both adjusting screws equally the steepness of straight line 106 of the proportional band may be increased. By using centering springs of varying stiffness, the steering device may be set at varying maximum pressures for the right and left working chamber of the steering motor. This is desirable in a case where the piston rod extends from one side of the steering motor only and therefore has piston surfaces of varying size. In this case it is desirable that the maximum pressure in working chamber 4' be higher than in working chamber 4, so that for each maximum pressure the same maximum force is acting upon the piston.

The proportional band is not effected by the use of centering springs of varying stiffness. For whilst passing through straight line 106, the actuating device is under influence from the difference in the force of both centering springs, resulting in a linear rise in force for both steering directions along the straight line 106, the inclines being identical.

I claim:

1. In a fluid power assisted steering device including a high pressure pump (7) having a suction port (34) and a pressure port (12); a reservoir tank (25), at least one steering motor (3) having opposed working chambers (4, 4'); two steering valves, each of the steering valves having a housing enclosing a pressure chamber in permanent fluid communication with one of the working chambers of the steering motor and an actuating chamber, each steering valve, also, having a spring-loaded valve piston displaceable in opening and closing directions, said valve pistons being mechanically independent of each other, each of the valve pistons having two flow control means for respectively establishing fluid communication from the pressure port of the pump to the pressure chamber and from the pressure chamber to the reservoir tank and throttle flow means between the pressure and actuating chambers for opening of one of the two flow control means in response to an increase in pressure in the actuating chamber relative to pressure in the pressure chamber; a pair of pre-control valves respectively connecting the actuating chambers of the two steering valves to the reservoir tank, each of said pre-control valves being biased by a valve closing spring, and an actuating device (45) drivingly connected to the valve closing springs of the pre-control valves; the improvement residing in said pump (7) being of a reciprocating piston type controllable through the suction port (34) thereof, third flow control means (29) on each of the valve pistons of the steering valves for connecting the suction port to the reservoir tank, conduit means (12) connecting the pressure port of the pump to the two steering valves for supply of pressurized fluid to the steering valves independently of each other, said third of the flow control means (29) and the first of the flow control means (15) being sequentially closed followed by opening of the second of the flow control means (35) during displacement of the valve piston associated therewith in the closing direction resulting in pressure in each of the working chambers of the steering motor (3) increasing at a rate proportional to force applied to the actuating device (45) up to a cut-out level; and a cut-out device connected to the actuating device and the steering motor for permitting a rise in pressure in the working chambers at a rate substantially greater than said proportional rate when the pressure in the working chambers exceeds the cut-out level.

2. The improvement as defined in claim 1 wherein the housing associated with each of the steering valves encloses a reaction chamber (66, 66') pressurized to urge displacement of the valve piston in the closing direction, and additional throttle flow means (64, 64') for establishing restricted fluid communication between the reaction chamber and the pressure chamber (21, 21'); and adjustable pressure holding valve means (70) connected to the reservoir tank for blocking outflow of fluid thereto from the reaction chambers below a maximum pressure level.

3. The improvement as defined in claim 2 wherein the pressure holding valve means includes a common check valve (70) connected to the reservoir tank, and two back pressure valves (68,68') through which the common check valve is in fluid communication with the reaction chambers of the two steering valves.

4. The improvement as defined in claim 1 wherein a torque-transmitting drive coupling between the actuating device and the pre-control valves (43, 43') rotatable in opposite directions about a rotational axis within limits, including an input member (72) and an output member (76), one of said members (72) having a crossarm (88) and the other of the members (76) having stops (92) engageable with the crossarm, centering spring means (98,98') disposed between said members for urging thereof to a neutral position, each of said pre-control valves having valve seats mounted on said other of the member (76), said valve closing spring (86) for the pre-control valves being mounted on said one of the members (72) and having arms extending at right angles to said rotational axis, and elastic stop means (94) mounted on the crossarm for engagement with the arms of the valve closing spring in response to relative angular displacement of the members from the neutral position by an amount corresponding to pressurization of the working chambers of the steering motor up to the cut-out level.

5. The improvement as defined in claim 4 wherein said centering spring means yieldably mounts the stop means (94) on the crossarm (88).

6. The improvement as defined in claim 5 including means (100) for adjusting the bias of the centering spring means holding the pre-control valves (43, 43')

closed below a maximum limit pressure (H, H') in the working chambers of the steering motor.

7. The improvement as defined in claim 5 wherein maximum pressure developed in the working chambers of the steering motor (3) is determined by the stiffness of the centering spring means (98, 98').

8. In a fluid power assisted steering apparatus including a pump (7) having a suction port, a servomotor (3), a steering control valve operatively connecting the pump to the servomotor and having a fluid pressure actuated valve piston displaceable in opposite directions from a neutral position, an actuating device (45) and pre-control valve means (43, 43') operatively connecting the actuating device to the steering control valve for controlling operation of the valve piston, the improvement comprising flow control means mounted on the valve piston for regulating pump pressure through the suction port of the pump to vary pressure in the servomotor as a substantially proportional function of force applied to the actuating device within a predetermined pressure range having an upper limit, and means connected to the actuating device and the servomotor for modifying operation of the pre-control valve means to change the variation in pressure in the servomotor as a different function of the force above the upper limit of said pressure range.

* * * * *